June 2, 1953 S. B. McLEOD 2,640,465
POWER UNIT
Filed Dec. 15, 1950 2 Sheets-Sheet 1

INVENTOR.
STEWART B. McLEOD
BY
ATTORNEYS

June 2, 1953 S. B. McLEOD 2,640,465
POWER UNIT
Filed Dec. 15, 1950 2 Sheets-Sheet 2
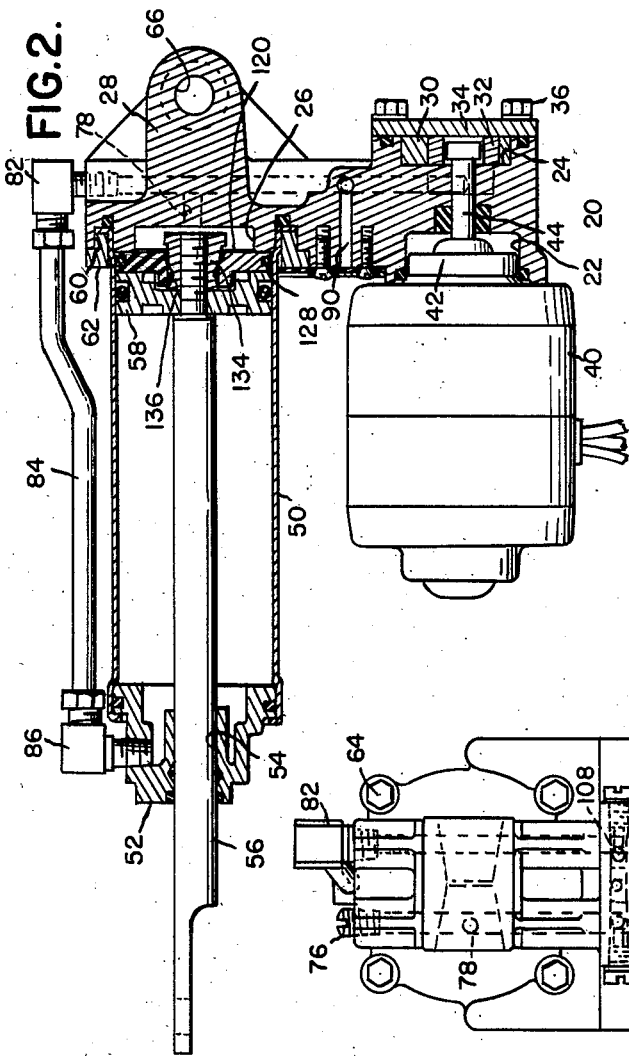
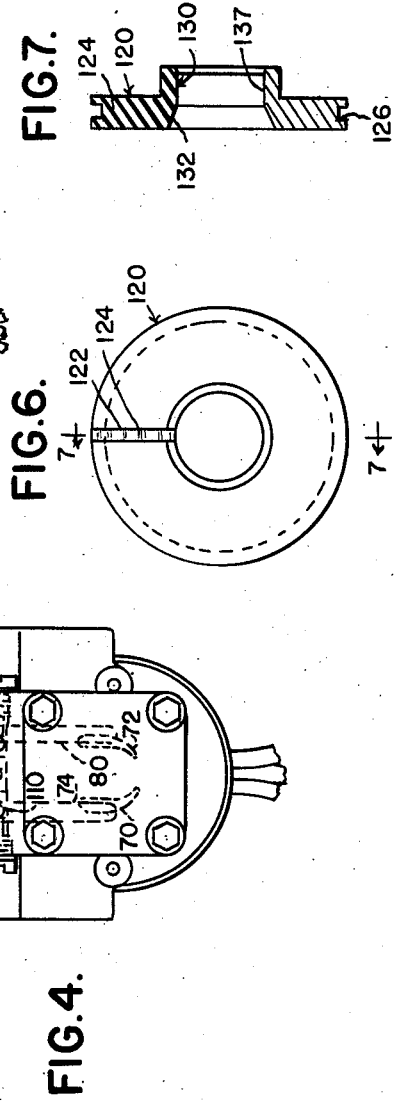
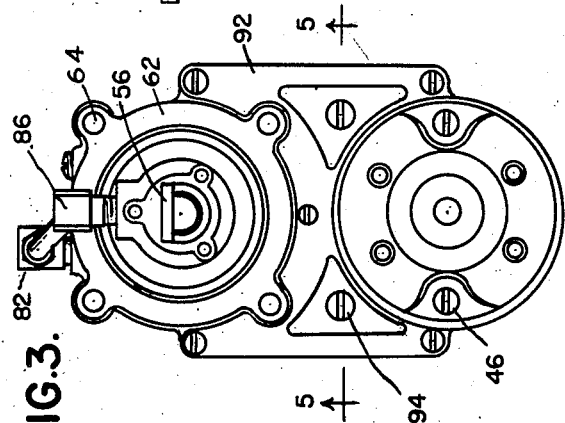
INVENTOR.
STEWART B. McLEOD
BY Whittemore
Hulbert & Belknap
ATTORNEYS Patented June 2, 1953

2,640,465

UNITED STATES PATENT OFFICE 2,640,465

POWER UNIT

Stewart B. McLeod, Dearborn, Mich., assignor to Detroit Harvester Company, Detroit, Mich., a corporation of Michigan Application December 15, 1950, Serial No. 200,954

6 Claims. (Cl. 121—40)

The present invention relates to a power unit and more particularly to a combination electric driven pump and piston and cylinder device for effecting relative movement between parts in an automobile. The present construction is designed particularly for use in effecting automatic movement of the front seat of the vehicle to adjusted position and includes means for effectively locking the seat in adjusted position when the motor is de-energized.

It is an object of the present invention to provide a power unit characterized by its compactness, simplicity, and economy of construction.

It is a further object of the present invention to provide a power unit combining the advantageous features of electric motor drive, together with the advantageous features of hydraulic means for ultimately transmitting power.

It is a further object of the present invention to provide a power unit for moving a vehicle component including means effective to lock the component in adjusted position.

More specifically, it is an object of the present invention to provide a power unit including a piston and cylinder in conjunction with a fluid circuit for establishing a block to lock the piston against movement in one direction in combination with a friction locking device for locking the piston against movement in the other direction.

Other objects and features of the invention will become apparent as the description proceeds, especially when taken in conjunction with the accompanying drawings, wherein:

Figure 2 is a plan view of the power unit shown in Figure 1 with the parts in section.

Figure 3 is an end view of the power unit looking to the right in Figure 2.

Figure 4 is an end view of the power unit looking to the left in Figure 2.

Figure 6 is an end view of the locking ring employed in the cylinder.

Figure 7 is a section on the line 7—7, Figure 6.

Figure 1:
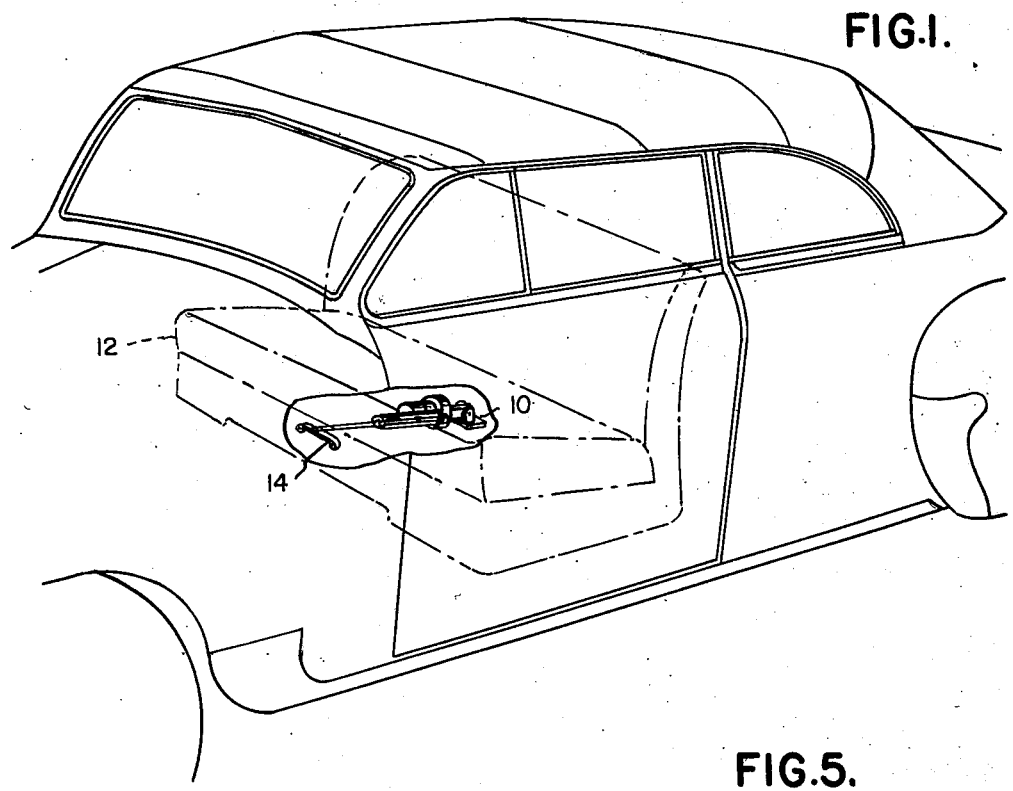
Figure 1 is a fragmentary perspective phantom view of a vehicle showing the manner in which the power unit is attached for effecting adjustment of the front seat.

Referring now to the drawings, the power unit is illustrated as pivotally secured to a bracket 10 located on the floor of the vehicle beneath the seat 12 and connected at its other end to a bracket 14 carried by the seat. Thus, as the power unit is energized the seat is moved forwardly or rearwardly of the vehicle.

Referring now to Figures 2–7, the power unit comprises essentially a unitary base 20 preferably formed as a casting, having a cylindrical motor seat 22 formed thereon, a cylindrical pump recess 24 formed therein, a circular cylinder seat 26 formed thereon, and a bracket 28 extending therefrom.

A rotary pump comprising an internally toothed gear 30 and an externally toothed gear 32 is located in the pump recess 24, the recess being closed by a closure plate 34 suitably held in place by screws 36 or the like. The motor 40 has a cylindrical projection 42 located within the motor seat 22 and has its shaft 44 projecting through an opening formed in the base 20 intermediate the motor seat 22 and the pump recess 24. The motor is clamped to the base by suitable clamping screws 46.

The hydraulic power device comprises a cylinder 50 having a head 52 at its outer end provided with an opening 54 through which extends a piston rod 56. The piston rod is connected at its inner end to a piston 58. The base 20 includes an annular recess 60 surrounding the seat 26 which receives an out-turned flange provided on the inner end of the cylinder and which is retained in place by a clamping ring 62 held in place by suitable clamping screws 64. The mounting projection 28 is provided with an opening 66 of circular cross-section, the axis of which is perpendicular to and intersects the axis of the cylinder 50.

Located within the base 20 and intersecting the inner end of the pump recess 24 are valve ports 70 and 72. The motor 40 and the pump are both reversible so that the ports 70 and 72 may be the inlet or outlet ports depending upon the direction of rotation of the motor. A drilled passage 74 extends longitudinally of the base 20 and is closed at its outer end by a threaded plug 76 or the like. Interconnecting the drilled passage 74 with the interior of the cylinder 50 is a short transverse passage 78. A second drilled passage 80 extends longitudinally of the base 20 and connects the port 72 to an external fitting 82 located at one end of the base. A metal conduit 84 connects the fitting 82 to a second fitting 86 located at the outer end of the cylinder 50. The passages 74 and 80 thus connect opposite sides of the rotary pump to opposite ends of the cylinder 50.

Due to the presence of the piston rod 56 in the outer portion only of the cylinder, movement of the piston requires a larger volume of liquid to flow through passage 78 at the right hand end of the cylinder than through conduit 84 connected to the left hand end of the cylinder as seen in Figure 2. Means must be provided for taking care of this differential flow of fluid. This means takes the form of a fluid reservoir 90 which is formed as an enlarged cavity in the casting located generally between the motor support and the cylinder support. The reservoir 90 is provided with a removable cover plate 92 which in turn is provided with removable filling plugs 94.

Figure 5:
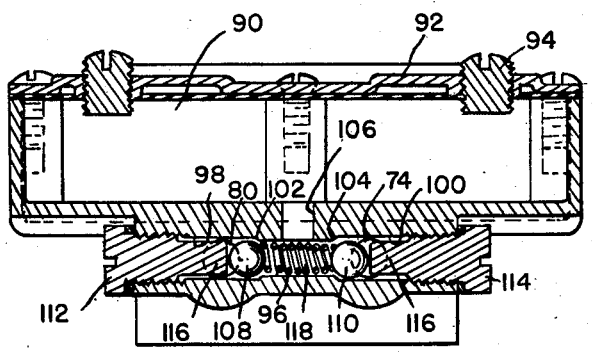
Figure 5 is an enlarged section on the line 5—5, Figure 3.

As best seen in Figure 5, the passages 74 and 80 are interconnected by a transversely drilled passage 96 which at its outer ends is enlarged to provide valve chambers 98 and 100. The intersection between the transverse passage 96 and the valve chambers is shaped to form valve seats 102 and 104. Intermediate its ends the passage 96 connects to a short passage 106 providing communication between the interior of the reservoir 90 and the passages 74 and 80.

Located within the valve chambers 98 and 100 are ball valves 108 and 110 respectively. The outer ends of the chambers 98 and 100 are closed by removable plugs 112 and 114 respectively, each of which is provided with an inwardly extending portion 116 constituting an abutment limiting movement of the adjacent ball valve away from its seat. Abutment 116 on plug 114 permits valve 110 to move away from its seat substantially further than does valve 108. It will be observed that the dimensions of the enlarged valve chambers 98 and 100 are such that the ball valve 108 or 110 will not prevent flow of fluid longitudinally of the passages 80 or 74 whether the valves are seated or not. Intermediate the ball valves 108 and 110 is a relatively light compression spring 118. Normally, the spring retains both valves away from their associated valve seats, but the effectiveness of the spring is carefully selected such that the valves may be seated by the accumulation of pressure within the system as will now be described.

Assuming that the motor is operating in a direction to supply fluid through the port 70, passage 74, and passage 78 to the end of the cylinder adjacent the base 20, closing valve 110, since full pump pressure acts on the valve. This results in movement of the piston 58 to the left as seen in Figure 2. The entire hydraulic system is at all times filled with fluid so that as the piston 58 moves to the left, fluid is expelled through the fitting 86, conduit 84, fitting 82, and passage 80, to the port 72 of the pump which at this time operates as the inlet port. However, since less fluid is expelled from the cylinder at this time than is required to move the piston 58, an excess of fluid must be made available to the pump. This is provided by the reservoir 90. The passage 80 will at this time be under suction and accordingly, the valve 108 will be retained off its seat and fluid will flow from the reservoir into the passage 80 and thence to the pump.

During the reverse operation of the motor an excess of fluid is expelled from the cylinder through the passages 78 and 74, over what is delivered by the pump through the passage 80. This excess fluid is accommodated by the reservoir 90. At this time, since the passage 80 is under the pressure the valve 108 will be closed thus preventing fluid from flowing directly from the pump to the reservoir. Valve 110, being widely spaced from its seat, remains open under the reduced pressure in passage 74, letting fluid flow into reservoir 90 from passage 74. Thus, as the excess fluid appears in the system, displaced from the cylinder as previously described, the fluid flows past the valve 110 into the reservoir.

In order that the seat will be retained in adjusted position when the motor is de-energized, the following arrangement is effective: Assuming that the piston 58 is in an intermediate position it will be apparent that mechanical forces applied to the piston tending to move it to the right will expel more fluid from the right of the piston 58 than is drawn into the cylinder to the left of the piston. This excess flow of fluid builds up pressure in the passages 78 and 74, closing valve 110. If fluid is blocked from circulating through the pump, the complete hydraulic circuit is blocked and movement of the piston 58 to the right is effectively prevented. If as sometimes is preferred, the pump is constructed and arranged to provide for a restricted by-pass flow therethrough when it is idle, fluid will pass through the pump from the passage 74 to the passage 80 and will tend to flow through fitting 82, conduit 84, fitting 86, and thus into the left hand end of the cylinder as seen in Figure 2. However, since more fluid is displaced from the inner end of the cylinder than can flow into the outer end thereof, pressure instantly builds up in passage 80 with the result that ball valve 108 is also forced against its seat. This completely blocks the system and prevents movement of the piston to the right as seen in Figure 2, under application of external mechanical forces.

Figure 8:
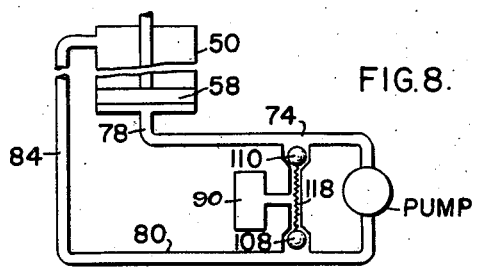
Figure 8 is a diagrammatic view of the power unit and hydraulic system.

The system may be considered as a closed hydraulic circuit, diagrammatically shown in Figure 8. The closed circuit comprises the pump, passages 74 and 78, the cylinder 50, conduit 84, and passage 80. Due to the differential volume flow into and out of the cylinder, this closed circuit requires replenishment when the piston moves up as seen in Figure 8, and this replenishment is accomplished by flow of fluid from the reservoir 90 past valve 108, which opens freely to permit this flow. On the other hand, movement of the piston down as seen in Figure 8, requires displacement of fluid from the system into the reservoir 90. When the pump is operating in the proper direction, fluid in passage 80 is under pump pressure, and holds valve 108 on its seat. This compresses spring 118 and biases valve 110 away from its seat, and due to the relatively great clearance between valve 110 and its seat, valve 110 remains open to permit flow of fluid past valve 110 to the reservoir. However, when the pump is not operating, valve 108 is not pressed against its seat and hence spring 118 is not compressed to urge valve 110 away from its seat. Hence valve 110 will close when even slight pressure develops in passage 74, as will occur if external force is applied to move the piston down as seen in Figure 8. If the pump blocks fluid flow when it is not operating, closure of valve 110 completes a fluid block which prevents movement of the piston to the right. If however fluid can by-pass the pump and flow into passage 80, pressure builds up in the passage, since less fluid can flow into the upper end of the cylinder than is displaced from its lower end as seen in Figure 8. This closes valve 108 and fluid is thus prevented from being displaced from the closed system. This results in a fluid lock which prevents movement of the piston downwardly as seen in Figure 8.

However, the hydraulic block previously described is not effective to prevent upward movement of the piston 58 as seen in Figure 8, since such movement tends to draw excess fluid into the closed hydraulic system, which flow of fluid is permitted by movement of the ball valve 110. Accordingly, in order to prevent movement of the piston 58 upwardly as seen in Figure 8, other means are provided.

This means takes the form of an expansible friction locking ring 120 which is shown in detail in Figures 6 and 7. The ring 120 is provided with a radial slot 122 therein which is filled with rubber 124 adapted to form a seal while at the same time permitting expansion and contraction of the ring 120. Preferably, the ring is provided with a peripheral groove 126 adapted to receive a sealing ring 128. The ring 120 is provided with a circular opening 130 including a conical portion 132. As best illustrated in Figure 2, the piston rod 56 extends completely through the piston 58 and has threaded to its projecting end a camming nut 134 which includes a conical camming portion associated with the conical portion 132 of the ring. In addition, the nut 134 includes a circular groove in which is received a sealing ring 136 which cooperates with cylindrical portion 137 of ring 120.

From the construction just described, it will be apparent that the space between the piston 58 and the ring 120 is effectively sealed against the admission of fluid under pressure from the hydraulic system.

The ring 120 is selected such that it normally is in light frictional contact with the interior wall of the cylinder, preferably, this contact being effected through the sealing ring 128. The dimensions of the conical camming portion on the nut 134 and the conical portion 132 of the ring are such that the ring is permitted slight axial movement relative to the piston 58.

When mechanical forces are applied to the piston rod tending to move the piston to the left, as seen in Figure 2, initial movement of the piston is not transmitted directly to the expansible friction locking ring 120. This ring will drag behind and as it does so it rides up on the camming surface of the nut 134, thus expanding the ring into tight locking frictional contact with the interior of the cylinder wall. Obviously, the cone angle of the camming parts will be selected such as to provide the requisite camming action and will depend upon the frictional drag of the expansible ring on the inner surface of the cylinder.

As will be apparent from the foregoing, the construction thus prevents any substantial movement of the piston in the cylinder in either direction by the application of external mechanical forces. When the friction locking ring 120 has been brought into tight frictional contact as previously described, it will be apparent that this frictional lock is released upon the application of fluid pressure into either side of the piston to effect further adjustment of the seat. Thus, when pressure is admitted to the left of the piston, as seen in Figure 2, the piston moves to the right and its initial movement moves the camming nut 134 out of camming relation to the ring. If, on the other hand, fluid pressure is applied to the right of the piston after the piston assembly has been frictionally locked, initial pressure of the fluid will act against the clamping ring. Since the admission of fluid to the space between the clamping ring and the piston is effectively prevented by the sealing means described, this will result in movement of the clamping ring toward the piston 58, thus releasing the frictional clamp.

While in the foregoing system reliance is placed on a hydraulic block to prevent movement of the piston in one direction, it will be apparent that if preferred, the frictional locking ring 128 could be duplicated and provided at opposite sides of the piston so that movement of the piston upon the application of external mechanical forces would be prevented in both directions by frictional interlock rather than by a hydraulic lock.

The drawings and the foregoing specification constitute a description of the improved hydraulic power unit in such full, clear, concise and exact terms as to enable any person skilled in the art to practice the invention, the scope of which is indicated by the appended claims.

What I claim as my invention is:

1. In a power unit, a cylinder, a piston assembly in said cylinder comprising a piston rod, a piston rigidly connected to said piston rod, an expansible friction ring having a central opening therethrough, said piston having a frusto-conical cam extending axially therefrom with its smaller end disposed toward said piston, the larger end of said cam extending through the central opening in said friction ring, said ring being relatively movable away from and toward said piston respectively to effect positive expansion and to permit contraction of said ring, said piston having peripheral sealing means engaging the cylinder wall, said ring having peripheral sealing means engaging the cylinder wall and in relatively light frictional contact therewith when said ring is contracted, and annular sealing means intermediate said cam and the central opening in said ring.

2. Structure as defined in claim 1 in which said ring is provided with a generally radial slot extending between its central opening and its periphery, and means effective to seal said slot in all stages of expansion of said ring.

3. Structure as defined in claim 2 in which the said means comprises a rubber-like material located in said slot and bonded to the confronting edges of the slot.

4. A friction-lock piston and cylinder device comprising a cylinder, a piston movable in said cylinder, annular sealing means carried by the periphery of said piston effective to provide a seal between the piston and cylinder, a cam extending axially from said piston and rigidly secured thereto, said cam having a camming portion of increasing cross-section in a direction away from said piston, an expansible friction ring having a central opening through which said cam extends, the central opening having a cam surface cooperable with the camming portion of said cam and effective to expand said ring radially upon relative axial separation between said piston and ring, annular sealing means carried by the periphery of said ring effective to provide a seal between the ring and cylinder and to provide a light frictional drag on the cylinder inner wall when said ring is in contracted condition, and annular sealing means interposed between said cam and the central opening in said ring to maintain a seal during relative axial movement between said piston and ring.

5. Structure as defined in claim 4 in which said friction ring has a general radial slot extending from the central opening thereof to its periphery, and sealing means effective to seal said slot in all stages of expansion of said ring.

6. Structure as defined in claim 5 in which said sealing means comprises a rubber-like material in said slot and bonded to the confronting edges of said slot.

STEWART B. McLEOD.

References Cited in the file of this patent

UNITED STATES PATENTS

| Number | Name | Date |
|---|---|---|
| 1,764,098 | Galloway | June 17, 1940 |
| 2,205,346 | Clench | June 18, 1940 |
| 2,325,775 | Horton | Aug. 3, 1943 |
| 2,379,989 | Rappl et al. | July 10, 1945 |
| 2,432,799 | Rappl | Dec. 16, 1947 |
| 2,432,895 | Horton | Dec. 16, 1947 |
| 2,479,063 | Forsythe | Aug. 16, 1949 |
| 2,586,682 | McLeod | Feb. 19, 1952 |